United States Patent [19]

Patil et al.

[11] Patent Number: 4,618,375
[45] Date of Patent: Oct. 21, 1986

[54] TRANSPARENT IRON OXIDE PIGMENTS

[75] Inventors: Arvind S. Patil, Wyoming; Louis J. Pepoy, Holland, both of Mich.

[73] Assignee: BASF Corporation, Wyandotte, Mich.

[21] Appl. No.: 657,579

[22] Filed: Oct. 4, 1984

[51] Int. Cl.$^4$ ................................................ C08K 3/20
[52] U.S. Cl. .................... 106/304; 106/309; 423/140
[58] Field of Search .............. 106/304, 309; 423/140

[56] References Cited

U.S. PATENT DOCUMENTS 4,414,033 11/1983 Patil et al. .............................. 106/34

OTHER PUBLICATIONS

Derwent Abstract, Accession No. 83-31187k/13, Japanese Pat. No. J58029863, Feb. 22, 1983.

*Primary Examiner*—Amelia B. Yarbrough
*Attorney, Agent, or Firm*—Bernhard R. Swick

[57] ABSTRACT

The present invention relates to a process for preparing transparent iron oxide pigments comprising reacting an iron compound, an ammonia releasing compound and water in a non-aqueous solvent in which both the iron compound and the ammonia-releasing compound have appreciable solubility. The reaction is performed by refluxing this composition. Where a red pigment is desired, a high boiling alcohol may be employed whereby the refluxing is carried out above 200° C. which thus converts the pigment to a red iron oxide pigment during the reflux step. In order to get a metallic finish, aluminum flake pigment may be added to a mixture of the iron compound and solvent prior to addition of the ammonia-releasing salt.

25 Claims, No Drawings

TRANSPARENT IRON OXIDE PIGMENTS

BACKGROUND OF THE INVENTION

The instant invention relates to transparent iron oxide pigments. More specifically, the instant invention relates to a process for substantially improving the transparency of such pigments.

Iron oxide pigments are found in nature as mineral deposits. There are three types of iron oxide pigments which are found in nature as mineral deposits. These are limonite, hematite, and magnetite. Limonite is yellow and has a chemical formula of $Fe_2O_3 \cdot xH_2O$ where x is an integer. As can be seen from its formula, it is a hydrated iron(III)oxide. Hematite is red and has a chemical formula of $Fe_2O_3$. It is an anhydrous iron(III)oxide. Magnetite is black and has a chemical formula of $Fe_3O_4$. It is considered to be a spinel containing iron(II) and iron(III)ions.

In addition to the natural mineral deposits, iron oxide pigments can be obtained synthetically. The prior art preparation of iron oxide pigments is well known. Reference is made to various topics concerning iron oxide such as "Pigments (Inorganic)," pages 816–818, vol. 17, *Encyclopedia of Chemical Technology*, by Kirk-Othmer, 3rd Edition, published by John Wiley & Sons. Synthetic methods for preparing iron oxide pigments generally involve the alkali precipitation of iron(II) compounds from a soluble iron(II)salt and the oxidation of the precipitated iron(II) compound to an iron(III)oxide pigment slurry. The pigment produced by such methods corresponds to the yellow hydrated iron(III)oxide previously described. The yellow pigment is recovered from the slurry by filtration, washing, and drying. The alkali precipitation must occur under acidic conditions; otherwise, dark brown or black undesirable color shades will be produced. Iron oxide pigments of various yellow shades can be prepared by controlling the temperature and rate of oxidation. Red, orange and other colors can be prepared by calcining the yellow pigments at high temperatures.

Iron oxide pigments which have an average particle size less than 0.1 micron are considered to be transparent because they can transmit visible light. Stated another way, "transparent pigment" is pigment having a majority of the particles smaller than the wavelength of light. Iron oxide pigments which have an average particle size greater than 0.1 microns and which cannot transmit visible light are considered to be opaque.

Yellow and red transparent iron oxides are used in combination with aluminum flake pigments to produce automotive metallic top coats. The metallic effect is dependent on the degree of transparency of the pigment.

Iron oxide pigments produced by the alkali precipitation of iron compounds from a soluble iron salt contain salts as a result of the hydrolysis reaction which have to be subsequently washed after the pigment is filtered. Also because of the high surface tension of the water, the pigment undergoes agglomeration during drying which makes the pigment hard to disperse. Accordingly, it is the purpose of the instant invention to provide a process for producing extremely fine iron oxide pigments. It is an additional purpose of the instant invention to be able to produce extremely fine red iron oxide pigments during the normal processing, i.e., a one-step reaction whereby the necessity of calcining the yellow iron oxide pigment to get red is eliminated. It is also a purpose of the instant invention to be able to produce a metallic pigment for automobile top coats whereby fracturing of the aluminum flake particles is minimized and the aluminum flake is included during the normal process to produce the yellow or red iron oxide pigment.

SUMMARY OF THE INVENTION

The present invention relates to a process for preparing transparent iron oxide pigments comprising reacting an iron compound, an ammonia releasing compound and water in a non-aqueous solvent in which both the iron compound and the ammonia-releasing compound have appreciable solubility. The reaction is performed by refluxing this composition. Where a red pigment is desired, a high boiling alcohol may be employed whereby the refluxing is carried out above 200° C. which thus converts the pigment to a red iron oxide pigment during the reflux step. In order to get a metallic finish, aluminum flake pigment may be added to a mixture of the iron compound and solvent prior to addition of the ammonia-releasing salt.

DESCRIPTION OF THE PREFERRED EMBODIMENTS

The iron compounds that are the raw material for the instant invention can be any of the available and known iron salts such as ferrous and ferric sulfate and ferrous and ferric chloride. Ferrous chloride ($FeCl_2 \cdot 4H_2O$) is the preferred iron compound for the instant invention.

In a preferred embodiment the iron compound is mixed with the non-aqueous solvent in an amount of about 1 to 50 percent by weight of the solvent or to the limit of solubility. The optimum is about 15%. This composition is then heated to dissolve the iron compound after which the ammonia-releasing compound is added preferably in about stoichiometric amount. The amount of ammonia-releasing compound is about 1 to 20 percent by weight based on the weight of the solvent, optimum about 5 percent. A preferred ammonia-releasing compound is urea. Other suitable ammonia-releasing compounds include various aliphatic and aromatic amides, amide-nitrile, various ureides (reaction products of urea with various acid chlorides or anhydries) such as acetylurea. Particularly amides may be used for this purpose such as formamide, acetamide, propionamide, n-butylamide, n-Valeramide, stearamide, benzamide, succinmide, and phthalimide. And even more particularly, cyanamides such as calcium cyanamide and other nitriles such as acetonitrile, n-valeronitrile, benzonitrile, p-tolunitrile.

Any polar solvent capable of dissolving the iron compound and the ammonia-releasing compound in equivalent quantities may be employed. Such solvents include various alcohols such as methyl, ethyl, n-propyl, n-butyl, n-pentyl, n-hexyl, n-heptyl, n-octyl, n-decyl, n-dodecyl, n-tetradecyl, n-hexadecyl, n-octadecyl, isopropyl, isobutyl, sec-butyl, tert-butyl, isopentyl, amyl, tert-pentyl, cyclopentanol, cyclohexanol, allyl, crotyl, methylvinylcarbinol, benzyl, α-phenylethyl, β-phenylethyl, diphenylcarbinol, triphenylcarbionol, cinnamyl, and glycols such as ethylene glycol, propylene glycol, 1,3-propanediol, glycerol and pentaerythritol. The solvent selected will depend on the iron salt employed, the ammonia-releasing compound and also on whether a yellow or red iron oxide is desired. The ammonia and iron salt are preferably reacted in stoichiometric quantities since quantities other than these are uneconomic. Where the iron compound is a ferrous salt, the proper proportion is two moles of the ammonia released or 1 mole of urea per mole of ferrous ion. Where a ferric salt is employed, the proportion is 1.5 moles of urea or 3 moles of the ammonia released per mole of ferric ion. A small amount of water is then added and the composition refluxed for from 1 to 24 hours at the reflux temperature of the selected solvent. The amount of water is the stoichiometric amount necessary to produce the desired pigment. It may range from about 0 to 5 percent based on the weight of the solvent. The yellow iron oxide pigment generally has a formula $FeO.xH_2O$. The amount of water added is preferably the stoichiometric amount to provide the desired amount of combined water. In general, it is preferred that the letter x have an average value of 1. For producing yellow iron oxide, a preferred solvent is ethanol which refluxes at from 60° to 80° C. Where it is desired to produce a red pigment, a preferred solvent is decyl alcohol which has a reflux temperature of 180° to 230° C. and the mixture should be heated to a temperature above 200° C. in order to get a red rather than a yellow iron oxide pigment. After refluxing, the product is washed with the non-aqueous solvent, filtered, and dried. Conventional filtration and drying equipment may be employed. In order to produce a metallic finish, aluminum flake pigment is added to the mixture of iron compound and solvent prior to the addition of the ammonia releasing salt.

The non-aqueous solvent could also have some solubility for water. Once the iron salt and ammonia releasing compound are dissolved in the solvent the hydrolysis of the ferrous ion commences when urea releases the ammonium ion. Unlike the hydrolysis reaction in the presence of strong alkali such as sodium hydroxide or ammonium hydroxide, this reaction occurs slowly producing extremely fine particles of yellow iron oxide. Also the non-aqueous reaction affords quick filtering and drying of the pigment without causing any agglomeration and dispersibility problems that are characteristic of the aqueous system. No milling is thus necessary.

By suspending the aluminum flakes in the solvent prior to adding the ammonia releasing compound, iron oxide pigment can be deposited on the aluminum flakes. The resultant pigment can then be dispersed by a Cowles dissolver which is a gentler form of dispersion and less likely to have an undesirable effect upon the aluminum flake pigment.

The examples which follow provide details which will enable those of ordinary skill in the art to practice this invention. All parts are by weight and all temperatures are in degrees Centigrade throughout the application unless otherwise indicated.

EXAMPLE 1

Three hundred (300) milliliters of ethanol were placed in a three-neck 500 milliliter flask assembly equipped with a stirrer, thermometer, and a reflux condenser. 45 grams of $FeCl_2.4H_2O$ were added followed by heating to 60° C. to dissolve the ferrous chloride, said heating being continued until a clear reddish solution is obtained. Urea in the amount of 15 grams was then added and hydrolysis began as soon as the urea was added since the ferrous chloride already contained some water. An additional 5 milliliters of water was then added followed by refluxing for 3 hours. This was followed by filtration, washing the cake with 100 milliliters of alcohol and drying. About 18 grams of transparent yellow iron oxide was recovered.

EXAMPLE 2

Example 1 was repeated with the exception that before adding the urea, one gram of aluminum flake pigment sold by the U. S. Bronze Company as 807 Grade was added. The resultant pigment had a golden yellow color and could be dispersed with a Cowles dissolver to give a metallic color effect. After dispersing with the Cowles dissolver a pigment with a brilliant yellow metallic color was obtained.

EXAMPLE 3

Three hundred (300) milliliters of decyl alcohol were placed in a three-neck 500 milliliter flask assembly equipped with a stirrer, thermometer, and a reflux condenser. Ten grams of $FeCl_2.4H_2O$ were added and stirred followed by heating to 60° C. to dissolve the ferrous chloride, said heating being continued until a clear reddish solution was obtained. Urea in the amount of 15 grams was then added and hydrolysis began as soon as the urea was added since the ferrous chloride already contained some water. An additional 5 milliliters of water was then added followed by refluxing for 3 hours. The temperature was raised to 200° C. and held for 4 hours. This was followed by filtration, washing the cake with 100 milliliters of decyl alcohol and drying. About 4 grams of transparent red iron oxide were recovered.

EXAMPLE 4

Example 3 was repeated with the exception that before adding the urea, 0.5 gram of aluminum flake pigment sold by the U. S. Bronze Company as 807 Grade was added. The resultant pigment was dispersed with a Cowles dissolver to give a metallic color effect. After dispersing with the Cowles dissolver a pigment with a brilliant yellow metallic color was obtained.

EXAMPLE 5

Three hundred (300) milliliters of ethanol are placed in a three-neck 500 milliliter flask assembly equipped with a stirrer, thermometer, and a reflux condenser. 48 grams of $Fe_2(SO_4)_3.9 H_2O$ are added followed by heating to 60° C. to dissolve the ferric sulfate, said heating being continued until a clear reddish solution is obtained. Urea in the amount of 15 grams is then added and hydrolysis begins as soon as the urea is added since the ferric sulfate already contains some water. An additional 5 milliliters of water is then added followed by refluxing for 3 hours. This is followed by filtration washing the cake with 100 milliliters of alcohol and drying. About 10 grams of transparent yellow iron oxide are recovered.

The embodiments of the invention in which an exclusive privilege or property is claimed are defined as follows:

1. A process for preparing transparent iron oxide pigment comprising reacting an iron compound, an organic ammonia releasing compound and water in a non-aqueous solvent in which both the iron compound and ammonia releasing compound have appreciable solubility, and in which water has some solubility by refluxing for a period of about 1 to 24 hours.

2. The process of claim 1 wherein said refluxing is followed by washing with non-aqueous solvent, filtration and drying.

3. The process of claim 2 wherein the amount of iron compound is about 1 to 50 percent, the amount of said ammonia releasing compound is about 1 to 20 percent, the amount of water is about 0 to 5 percent, all based on the weight of the solvent.

4. The process of claim 3 wherein said iron compound is a ferrous compound and said ammonia releasing compound is urea.

5. The process of claim 4 wherein said iron compound is ferrous chloride.

6. The process of claim 4 wherein the mole ratio of released ammonia to ferrous ion is about 2:1.

7. The process of claim 3 wherein said iron compound is a ferric compound and said ammonia releasing compound is urea.

8. The process of claim 7 wherein said iron compound is ferric sulfate.

9. The process of claim 7 wherein the mole ratio of released ammonia to ferric ion is 3:1.

10. The process of claim 3 wherein said solvent is ethanol and the reflux temperature is from about 60° to 80° C.

11. The process of claim 1 wherein said solvent is a high boiling alcohol, the reflux step is carried out at a temperature of at least about 200° C. and the product produced is a red iron oxide.

12. The process of claim 11 wherein said refluxing is followed by washing with non-aqueous solvent, filtration and drying.

13. The process of claim 12 wherein the amount of iron compound is about 1 to 50 percent, the amount of said ammonia releasing compound is about 1 to 20 percent, the amount of water is about 0 to 5 percent, all based on the weight of the solvent.

14. The process of claim 13 wherein said iron compound is ferrous chloride and said ammonia releasing compound is urea.

15. The process of claim 14 wherein said solvent is decyl alcohol and the reflux temperature is from about 180° to 230° C.

16. The process of claim 1 wherein aluminum flake pigment is added to the solvent before the addition of the ammonia releasing salt.

17. The process of claim 16 wherein said refluxing is followed by washing with non-aqueous solvent, filtration and drying.

18. The process of claim 17 wherein the amount of iron compound is about 1 to 50 percent, the amount of said ammonia releasing compound is about 1 to 20 percent, the amount of water is about 0 to 5 percent, all based on the weight of the solvent.

19. The process of claim 18 wherein said iron salt is ferrous chloride and said ammonia releasing salt is urea.

20. The process of claim 18 wherein said solvent is ethanol.

21. The process of claim 1 wherein said solvent is a high boiling alcohol and said reflux step is carried out at a temperature of at least 200° C. and where aluminum flake pigment is added to said solvent prior to the addition of the ammonia releasing compound.

22. The process of claim 21 wherein said refluxing is followed by washing with said solvent, filtration and drying.

23. The process of claim 22 wherein the amount of iron compound is about 1 to 50 percent, the amount of said ammonia releasing compound is about 1 to 20 percent, the amount of water is about 0 to 5 percent, all based on the weight of the solvent.

24. The process of claim 23 wherein said iron compound is ferrous chloride and said ammonia releasing compound is urea.

25. The process of claim 23 wherein said solvent is decyl alcohol and the reflux temperature is from about 180° to 230° C.

* * * * *